United States Patent
Force et al.

(10) Patent No.: US 8,557,029 B2
(45) Date of Patent: Oct. 15, 2013

(54) REGENERATION OF PURIFICATION BEDS WITH A JET COMPRESSOR IN AN OPEN LOOP CYCLE

(75) Inventors: Randall L. Force, Charleston, WV (US); Rachael L. Le Geyt, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 191 days.

(21) Appl. No.: 13/257,339

(22) PCT Filed: Apr. 15, 2010

(86) PCT No.: PCT/US2010/031199
§ 371 (c)(1),
(2), (4) Date: Sep. 19, 2011

(87) PCT Pub. No.: WO2010/123748
PCT Pub. Date: Oct. 28, 2010

(65) Prior Publication Data
US 2012/0024324 A1    Feb. 2, 2012

Related U.S. Application Data

(60) Provisional application No. 61/172,442, filed on Apr. 24, 2009.

(51) Int. Cl.
*B01D 53/04* (2006.01)
*B01J 20/34* (2006.01)

(52) U.S. Cl.
USPC ............... 95/148; 96/127; 96/130; 96/132; 96/133; 96/144

(58) Field of Classification Search
USPC .......... 95/90, 96, 148; 96/121, 126, 127, 130, 96/132, 133, 143, 144; 210/670
See application file for complete search history.

(56) References Cited

U.S. PATENT DOCUMENTS 3,733,775 A * 5/1973 Barrere, Jr. .................... 95/143
4,331,456 A * 5/1982 Schwartz et al. ................ 95/93
(Continued)

FOREIGN PATENT DOCUMENTS

DE     2631225 A1    1/1978
EP     0237685 A1    9/1987
(Continued)

OTHER PUBLICATIONS

Henzler, H. J.: "Continuous Mixing of Fluids" Online version of Ullmann's Encyclopedia of Industrial Chemistry Online version of Ullmann's Encyclopedia of Industrial Chemistry 2005, pp. 1-27, Retrieved from the Internet: URL:http://mrw.interscience.wiley.com/emrw/9783527306732/ueic/article/b04_561/current/pdf [retrieved on Jul. 20, 2007].

*Primary Examiner* — Frank Lawrence, Jr.
(74) *Attorney, Agent, or Firm* — Jennifer A. Schmidt

(57) ABSTRACT

Methods and systems for regenerating a purification bed take advantage of inert gas pressure, such as, for example, supplied by a pipeline. The inert gas (102) is provided at a first pressure and combined with a recycle composition (116) from the vessel (110, 110a) containing the material being regenerated. These streams form a regeneration fluid composition (114) at a second pressure less than the inert gas pressure, which is then routed to the vessel to regenerate the purification bed. A jet compressor (108) may be used for the combining of the inert gas and recycle streams. The recycled composition allows reduction in inert gas usage, while a portion is flared or otherwise disposed of.

22 Claims, 5 Drawing Sheets

(56) References Cited

U.S. PATENT DOCUMENTS

| | | | |
|---|---|---|---|
| 4,424,144 A | 1/1984 | Pryor et al. | |
| 4,971,606 A | 11/1990 | Sircar et al. | |
| 5,312,477 A * | 5/1994 | Minor | 95/99 |
| 5,925,169 A * | 7/1999 | Vertriest | 95/99 |
| 6,527,836 B1 * | 3/2003 | White et al. | 96/113 |
| 2004/0106752 A1 | 6/2004 | Gindelberger | |
| 2005/0043497 A1 | 2/2005 | Gindelberger et al. | |

FOREIGN PATENT DOCUMENTS

| | | |
|---|---|---|
| EP | 0586244 A1 | 3/1994 |
| GB | 1200806 A | 8/1970 |

* cited by examiner (Case B - Higher Temperature Heater, Jet Compressor, and Recycle Cooler)

(Case C - Recycle Steam Heater, Higher Temperature Heater, Jet Compressor, and Recycle Cooler)

REGENERATION OF PURIFICATION BEDS WITH A JET COMPRESSOR IN AN OPEN LOOP CYCLE

CROSS-REFERENCE TO RELATED APPLICATIONS

This application is a National Stage application under 36 U.S.C. §371 of International Application No. PCT/US2010/31199, filed Apr. 15, 2010, that claims the benefit of Ser. No. 61/172,442, filed Apr. 24, 2009, the disclosures of which are incorporated by reference in their entireties.

FIELD OF THE INVENTION

The present disclosure describes methods of regeneration of purification beds such as those used to purify feeds in polyethylene polymerization processes.

BACKGROUND

Regeneration of the purification beds used in olefin polymerization processes requires a high flow of nitrogen or other heat transfer gas, but for a limited number of hours per year. The trend in the art is to use once-through nitrogen as an inert heating and cooling fluid that also delivers any regeneration gas and carries away the evolved impurities to the flare. The high absolute and peak nitrogen use and flaring increases operating and investment costs.

An alternative design was developed that utilized a closed nitrogen recirculation cycle. Unfortunately, the investment cost was very high due to the need to cool the recirculating gas before compression in a blower or mechanical compressor. This cooling also can cause the condensation of water that is a by-product of the dryer regeneration. This requires additional investment for separation and disposal. There is also a concern that the recirculated residual hydrocarbons may "coke out" on the very high temperature heating elements of an in-line electric heater. Since impurities are evolved, the cycle cannot be completely closed during some steps of the regeneration.

U.S. Pat. No. 4,424,144 (Pryor et al.) described shaped products of a 3A zeolite formed either as beads or extrudates without any binder remaining. Both the beads and the extrudates can be used to dry a mixture of a hydrocarbon compound such as ethylene and water. The patent describes how the zeolite may be regenerated by purging with nitrogen in a laboratory bomb. Published U.S. Pat. Applications 20040106752 and 20050043497 (Gindelberger et al.) describe a molecular sieve purification bed used to purify ethylene on a laboratory scale prior to polymerization. However, there appears to be no discussion of using inert gas at pipeline pressure, or open-loop methods or systems for regenerating olefin purification beds, in these patent publications.

Thus, there is a need in the art to reduce the above-mentioned burdens of once-through nitrogen regeneration methods, and avoid the cost and problems associated with closed-loop methods of regenerating purification beds.

SUMMARY

This disclosure describes methods of regenerating purification beds using a fluid composition comprising an inert gas component, wherein the inert gas component is supplied at a pressure $P1$, where $P1$ is greater than a pressure $P2$ of a regeneration composition being routed to the purification bed being regenerated. The inert gas component may be supplied at a pressure of at least 1.5 times, or at least two times, or at least three times, or at least four times, or more than four times the pressure of the regeneration composition being routed to the vessel containing the purification bed being regenerated. The inert gas component may advantageously be supplied via a pipeline at pipeline pressure in certain embodiments. In other embodiments, the inert gas may be supplied by an inert gas generator, as described herein.

One or more jet or thermal compressors may be employed to compress a mixture of inert gas at pressure $P1$ and a recycled portion of the inert gas and evolved regeneration gases at pressure $P3$, where fresh inert gas such as nitrogen is used as the motive gas. In these embodiments the feed to the compressor will also comprise a recycled portion of the regeneration gas evolved from the vessel containing the purification bed being regenerated. In these methods, $P1>P2>P3$. Such methods may be referred to as "open-loop" recycle methods, since a portion of the inert gas and evolved regeneration gas is recycled, while a portion is routed to the flare or some other process or location. Where more than one compressor is used, the compressors may be arranged in parallel, series, or combination thereof (for example two in series, each having a compressor in parallel).

One advantage of methods described herein may be that no continuous pre-cooling of the compressor feed is required for a jet compressor. The discharge temperature from such a compressor is essentially a weighted average of the temperatures of the recycle stream and the fresh inert gas streams. In certain embodiments heating (or cooling) may be provided in the mixed stream between the compressor and vessel. In certain embodiments part-time heating or cooling may be provided in the recycled gas stream before the compressor suction. In certain embodiments, heating or cooling of the mixed stream may be foregone in favor of heating (or cooling) only the inert gas stream, as this avoids the extra pressure drop in the recirculation system and since the heater/cooler only contacts the inert gas stream, coking risk is substantially diminished or eliminated.

Also described herein are systems for carrying out the described methods.

Figure 1:
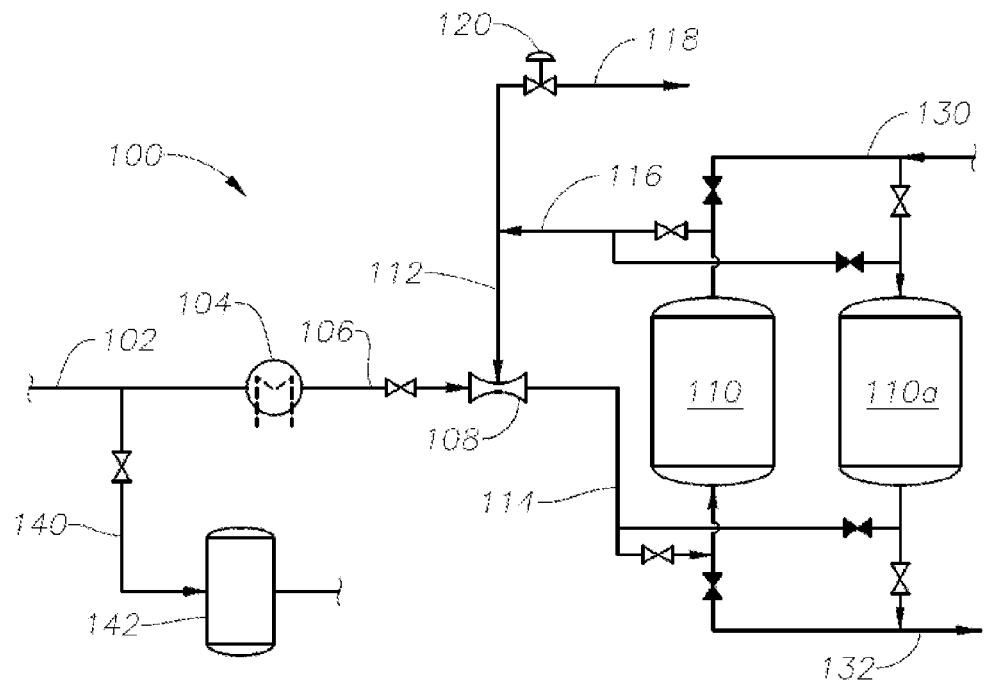
FIGS. 1-5 are schematic process flow diagrams of embodiments of methods and systems described herein.

It is to be noted, however, that FIGS. 1-5 are not to scale and illustrate only typical embodiments of this disclosure, and are therefore not to be considered limiting of its scope, for the disclosure may admit to other equally effective embodiments.

DETAILED DESCRIPTION

It is to be understood that the terminology used herein is for the purpose of describing particular embodiments only and is not intended to be limiting. It must also be noted that, as used in the specification and the appended claims, the singular forms "a," "an" and "the" include plural referents unless otherwise specified.

Regeneration of the purification beds used in olefin polymerization processes requires a high flow of nitrogen or other heat transfer gas, but for a limited number of hours per year. There are typically a variety of purification beds in an olefin polymerization complex. In the purification mode, the beds may either be reactive, in the sense that one or more chemical reactions between impurities and the bed material may occur in the beds as they are contacted with impure ethylene, propylene, or co-monomers such as butene, hexene, octene, and the like, or diluents such as ethane, propane, butane, isopentane, hexane, nitrogen, or non-reactive, where the impurities are adsorbed onto or into the bed material. The bed material is not a feature of this disclosure, but for example may be a copper complex, alumina complex, and the like. Two or more different bed materials may be placed in the same vessel, for example in stacked or co-mingled fashion. This may tend to reduce the total regeneration time and inert gas use versus separate vessels. As high-purity nitrogen is used in the polymerization reactors downstream of the purification beds, some of the beds are used to purify nitrogen to remove water and oxygen, which are considered olefin catalyst poisons.

A typical ethylene polymerization complex may include six vessels in ethylene purification service, two or three vessels in comonomer purification service, and two or three vessels in nitrogen purification service, some of which may be in parallel and some in series, so that some beds may be regenerated while the others are in purification service. For regeneration of these purification beds, the trend in the art is to use once-through nitrogen as an inert heating and cooling fluid that also delivers any regeneration gas and carries away the evolved impurities to the flare or other destruction device. The high absolute and peak nitrogen use and flaring increases operating and investment costs.

An alternative to the once-through methods and systems is to use a closed-loop method and system. Unfortunately, the investment costs are high due to the need to cool the recirculating gas before compression in a blower or mechanical compressor. This cooling also can cause the condensation of water that is a by-product of the dryer regeneration. This requires additional investment for separation and disposal. There is also a concern that the recirculated residual hydrocarbons may "coke out" on the very high temperature heating elements of an in-line electric heater. Since impurities are evolved, the cycle cannot be completely closed during some steps of the regeneration.

This disclosure describes methods and systems for regenerating purification beds using an open-loop cycle, wherein a portion of the vessel effluent is recycled, and the remainder vented from the system, for example to a flare system. An inert gas (sometimes referred to herein as a motive gas, heat transfer fluid, or heat transfer gas) component is provided, wherein the inert gas component is supplied at a pressure above a pressure in the purification bed being regenerated. In certain embodiments, the inert gas may be supplied at a pressure at least two times, or at least three times, or at least four times, or more than four times the pressure of the pressure in the vessel containing the purification bed being regenerated. The inert gas pressure is advantageously at least two times the pressure in the vessel to be regenerated to provide adequate flow rate through the bed being regenerated. While pressure less than at least two times the regeneration pressure may be feasible, performance of the regeneration may suffer. On the other hand, using pressure higher than about four times the regeneration pressure does not significantly increase the performance of regeneration to justify the higher pressure inert gas. However, higher pressures may be used if desired.

Referring to the drawing figures, where the same reference numerals are used to denote the same or similar components unless otherwise specified, FIGS. 1-5 are schematic process flow diagrams of five exemplary embodiments of methods and systems in accordance with this disclosure. Those skilled in the art will recognize alternatives to these embodiments after viewing the figures and reading the description herein, and these alternates are deemed to be within the scope of the present disclosure. Embodiment 100 illustrated schematically in FIG. 1 includes a supply conduit 102 for nitrogen or other inert gas. This is sometimes referred to herein as pipeline nitrogen, if nitrogen is the inert gas being used. Pipeline nitrogen is typically available at ambient temperature (about 20° C.) and 100 psig (690 kPa gauge) or higher pressure. Conduit 102 routes the inert gas first to a heater 104. The amount of heat introduced is dependent upon the regeneration temperature needed. Heater 104 may heat the gas in conduit 102 to a temperature of 200° C. or higher. The energy added in heater 104 may be controlled to give a target temperature in the mixed regeneration gas stream of conduit 114. A conduit 106 then routes the heated inert gas to a jet compressor 108 (sometimes referred to as a thermal compressor or jet eductor), which serves to both mix the inert gas with a recycle stream in conduit 112 returning from vessel 110, and to increase the pressure of the recycle stream to a pressure that will allow the regeneration composition to pass through the bed being regenerated.

The resulting regeneration composition passes through conduit 114 and into vessel 110 containing the material being regenerated. The regeneration composition in conduit 114 is approximately a weighted average of the compositions in conduits 106 and 112. Since evolved impurities are only a minor component of the recycle gas the mixed composition in conduit 114 is very close to the pipeline inert gas composition in conduit 106. With the motive and recycle gas compositions essentially identical the temperature at the outlet of jet compressor 108 in conduit 114 is essentially the weighted average of the temperature of the motive gas in conduit 106 and the temperature of the recycle gas in conduit 112. During the bed heating cycle the motive gas temperature in conduit 106 is higher than the recycle gas temperature in conduit 112. During the bed cooling cycle the motive gas temperature in conduit 106 is lower than the recycle gas temperature in conduit 112. The pressure in conduit 114 will be higher than the pressure in the recycle conduit 112 by the pressure drop through the bed to be regenerated and the piping. The pressure in the motive gas conduit 106 needs to be at least 1.5 times the absolute pressure in conduit 114, and in exemplary embodiments at least 2 times the pressure in conduit 114. A higher ratio of the conduit 106 pressure to the conduit 114 pressure will allow a greater percentage of recycle gas from conduit 112 and less use of fresh motive gas from conduit 106 for the same flow rate in conduit 114.

After the regeneration composition passes through vessel 110, in the process contacting the bed material being regenerated, an effluent from vessel 110 exits through an effluent conduit 116. A portion of effluent in effluent conduit 116 is recycled via conduit 112, and a non-recycled portion is vented, for example routed to a flare system via conduit 118. A back-pressure control valve 120 may help regulate pressure in vessel 110 by balancing the venting in conduit 118 to match the fresh inert gas addition in conduit 106. During certain periods of a typical regeneration cycle, for example during cooling of a regenerated vessel 110, the non-recycled portion maybe be vented to the atmosphere as the inert gas is then free of hydrocarbons.

The arrangement of FIG. 1 allows for the addition of additional purification vessels in parallel with vessel 110. The additional vessels may be regenerated simultaneously with vessel 110, or more commonly may be operating in their normal purification service, as shown with vessel 110*a*, while vessel 110 is regenerated. In normal purification service the gas or liquid to be purified is supplied via conduit 130, flows through one or more vessels 110*a*, and exists via conduit 132 for use in the manufacturing process. As one of skill in the art will recognize, in FIG. 1 the solid-colored valves indicate that they are closed. After the regeneration cycle of vessel 110 is completed it can be returned to purification service and one of the other vessels regenerated using the same heater 104 and jet compressor 108 that were used with vessel 110, with closing and opening of appropriate valves.

Figure 2:
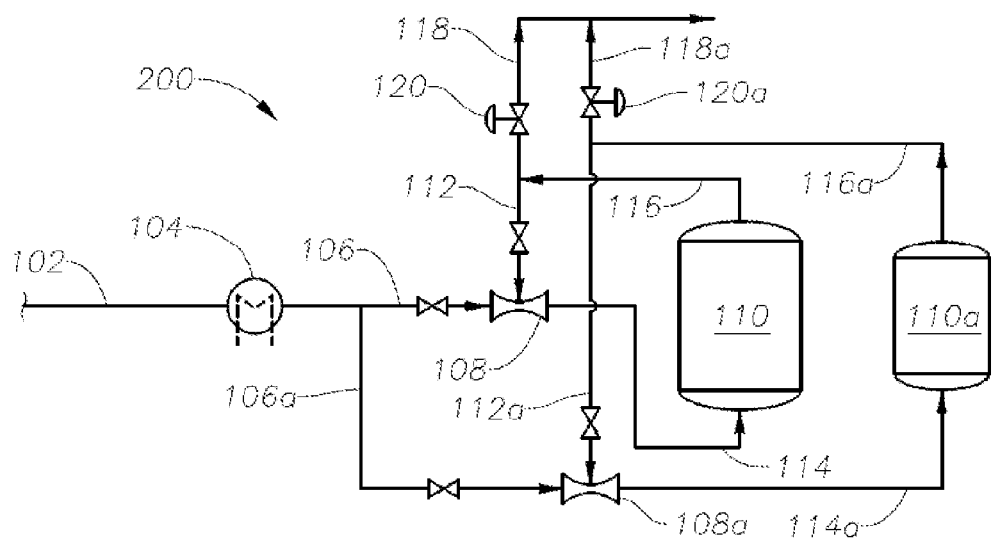

FIG. 2 illustrates one of a number of possible modifications of the method and system of FIG. 1. Embodiment 200 considers a situation where two or more vessels 110, 110*a*, ... 110*n* (vessel 110*n* is not illustrated for brevity; n is a number) may contain the same or different beds to be regenerated. Most olefin polymerization facilities will have several different types and volumes of beds requiring regeneration from time to time. In these embodiments, while a single jet compressor may satisfy all requirements, in certain embodiments such as embodiment 200 a dedicated jet compressor 108, 108*a*, 108*n* (jet compressor 108*n* not illustrated for brevity) may be provided for each vessel 110, 110*a*, 110*n* or group of similar vessels with similar beds to be regenerated. In these and similar embodiments, the jet compressors may be the same or different in terms of capacity, turn-down ratio, and other compression parameters. As a specific example, FIG. 2 illustrates conduits 106, 106*a* routing preheated pipeline nitrogen to jet compressors 108, 108*a*, to be combined with recycle streams flowing through conduits 112, 112*a*, to produce regeneration compositions routed through conduits 114, 114*a* to vessels 110, 110*a*. Effluent compositions from vessels 110, 110*a* exit the vessels through conduits 116, 116*a*, respectively, and a recycle portion from each vessel is routed through separate conduits 112, 112*a* to jet compressors 108, 108*a*, while non-recycled portions are routed through conduits 118, 118*a* to the flare system, pressure controlled by pressure regulators 120, 120*a*. One variation of embodiment 200, not illustrated, but considered within the scope of this disclosure, may be for separate conduits 102, 102*a* to route separate inert gas feeds to separate preheaters 104, 104*a*. In this way, should one preheater be out of service, the other may be used during regeneration of another bed or the heater size and location may be optimized for each vessel or group of similar vessels.

Figure 3:
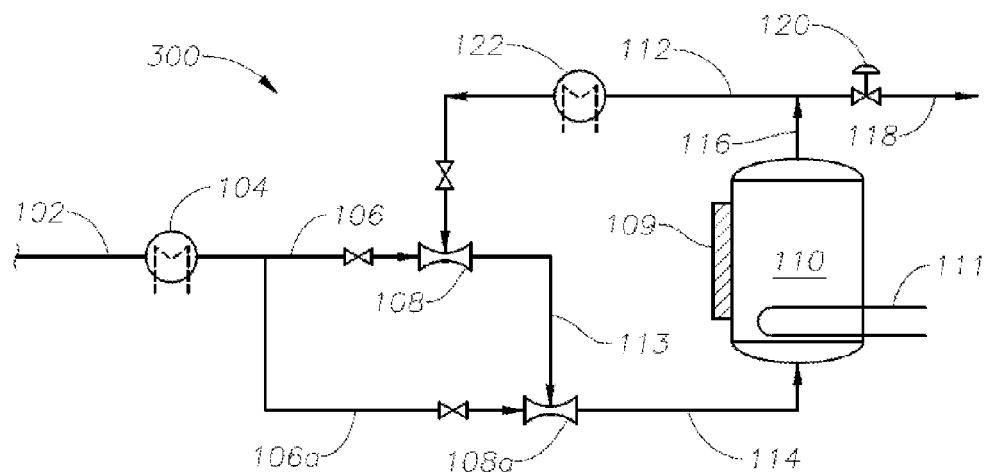

FIG. 3 illustrates an embodiment 300 featuring other variations of methods and systems within the disclosure. Embodiment 300 features first and second jet compressors 108, 108*a*, in series flow arrangement. The compressors 108 and 108*a* may be the same or different in terms of compression capacity, materials of construction, and other operating and structural details. Compressor 108 may compress a mixture of inert gas and recycle composition from a pressure P1 and temperature T1 to a pressure P2, and temperature T2, where P1 and T1 are the pressure and temperature, respectively, of the recycle composition in conduit 112, and P2 and T2 are the pressure and temperature, respectively, of the regeneration composition in conduit 113. Compressor 108*a* compresses the regeneration composition to a pressure P3 and temperature T3 in conduit 114, where P1<P2<P3.

Another optional feature illustrated schematically in FIG. 3 is the provision of a heat exchanger 122 in conduit 112 for heating or cooling the recycle composition. Heat exchanger 122 may be any type of heater, such as electric or steam, but in certain embodiments heat may be supplied in an indirect heat exchanger by a heat transfer fluid such as pressurized water or DOWTHERM. The addition of heat in exchanger 122 will decrease the required temperature in conduit 106 for the same regeneration gas temperature in conduit 114. In other embodiments heat exchanger 122 may be a cooler that uses air, water, or other fluid to cool the recycle flow in conduit 112. This cooling will lower the temperature in conduit 114 and so accelerate the cooling of the vessel 110 bed.

Two other optional features illustrated in FIG. 3 are the provision of a heat exchange jacket or heat exchange panel or panels 109, and a heat exchange coil or coils 111, either of which may be used for heating or cooling. The jacket or panel 109 and coil or coils 111 may either be electric, or employ a heat transfer fluid, such as water, steam, or glycol, or even a gas such as hydrogen, nitrogen, argon and mixtures thereof.

Figure 4:
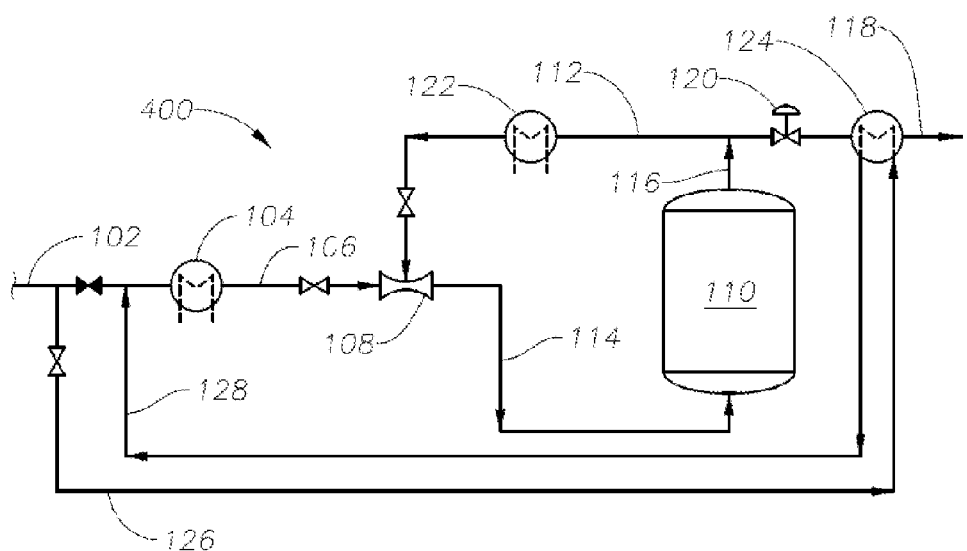

FIG. 4 illustrates an embodiment 400 featuring yet another aspect of methods and systems of the present disclosure. In embodiment 400 a heat exchanger 124 and conduits 126, 128 are provided for preheating the inert gas in conduit 102 with the non-recycled portion of the vessel 110 effluent composition flowing through conduit 118. A variation of this embodiment may be to route a portion (or all) of the non-recycled effluent to a heat exchanger in conduit 102. Preheating of the gas to heater 104 may be advantageously applied during the heating portion of the regeneration cycle. During the cooling portion of the cycle the gas flow through conduit 126 would be stopped and cool inert gas would flow directly through conduit 102 to heater 104. The heating in heater 104 would also be shutoff during this cooling cycle so that the cool inert gas flows through conduit 106 to the jet compressor 108.

Figure 5:
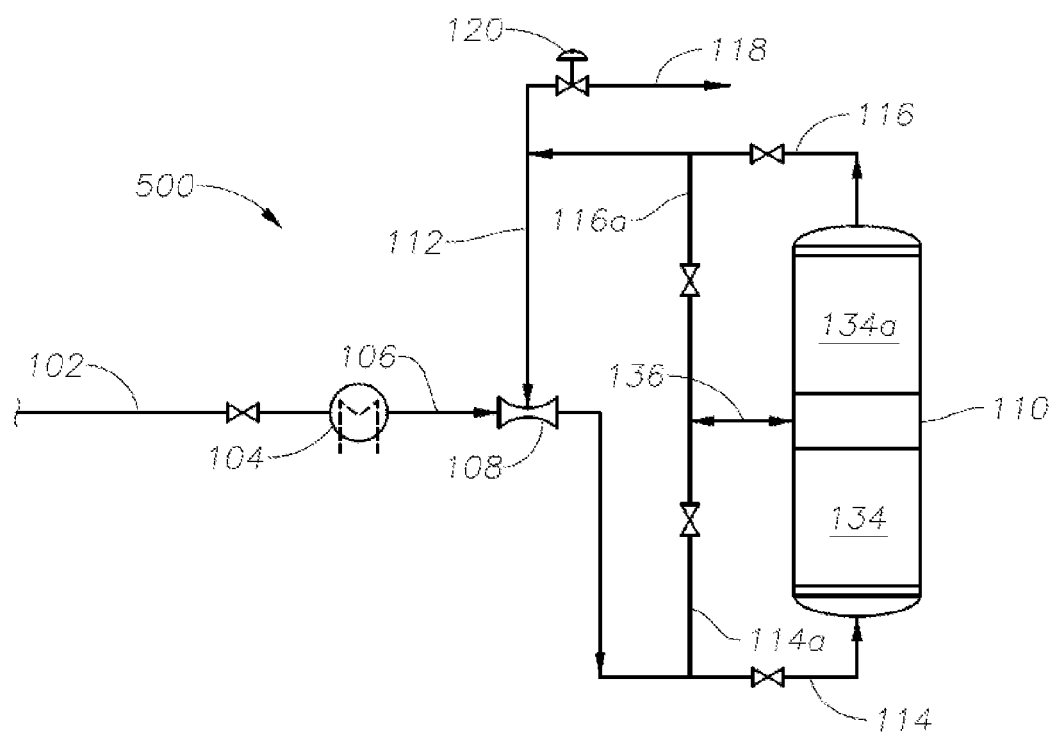

Another embodiment illustrated in FIG. 5 is where two or more beds are operated in series but arranged so that regeneration gas flow can be in series for some parts of the cycle and independent for other parts of the cycle. The beds may be in the same vessel as illustrated or in separate vessels. Examples where the arrangement of FIG. 5 might be advantageously used are where the beds have different target peak regeneration temperatures or one bed requires the addition of a secondary regeneration gas (such as hydrogen) for part of the cycle. In one example the initial heat up cycle might be for the hot gas from the jet compressor 108 to flow through conduit 114, up through bed 134, on up through bed 134*a*, then return to the jet compressor through conduits 116 and 112. When temperature limits were reached for one bed, for example bed 134*a*, the cycle could be switched so that continued heating of bed 134 may be performed by routing the gas through conduit 114, bed 134, conduit 136, conduit 116*a*, and conduit 112. This bypasses bed 134*a*. Part of the regeneration cycle could also pass the regeneration gas through conduit 114*a*, conduit 136, bed 134*a*, conduit 116, and conduit 112. This bypasses bed 134.

In certain embodiments, various combinations of the features illustrated in FIGS. 1-5 may be employed, as will be apparent to those of skill in the art. These variations are considered within the scope of this disclosure.

Referring again to FIG. 1, a conduit 140 and vessel 142 are indicated, representing some of the inert gas being routed to its own purification vessel or vessels, for example to remove water and oxygen. The purified inert gas is then routed to a polymerization reactor (not shown), perhaps via a booster compressor. In certain embodiments some of the purified inert gas may be used for regeneration of other beds, if desired.

A representative regeneration cycle for methods and systems described herein will include an initial de-pressurization time period, where the vessel to be regenerated is vented, perhaps to a flare system. The vessel may then be purged with inert gas in order to remove interstitial hydrocarbons and other of the more easily removable impurities, followed by a warm-up time period, where one or more heaters available to (or in) the system are turned on. As explained more fully herein, this may include one or more programmed (or unprogrammed) step changes in temperature. Once regeneration is complete as indicated by routine testing of the vessel effluent stream or by passage of a defined time at the elevated temperature, the heaters are shut off or reduced, allowing cooling inert gas to be circulated through the vessel. Some of the vessel effluent may be vented to atmosphere, or a flare system during this step. In one embodiment the jet compressor 108 is bypassed during all or part of the cooling cycle with the hot gases from the vessel 110 vented via conduit 118. In another embodiment the jet compressor 108 is used to recycle a warm recycle stream 112 and mix it with the ambient temperature motive gas in conduit 106. In another embodiment the recycle in conduit 112 is pre-cooled in heat exchanger 122, as illustrated in FIG. 2, in order to speed the cooling of vessel 110 without increasing the flow in conduit 106.

Figure 6:
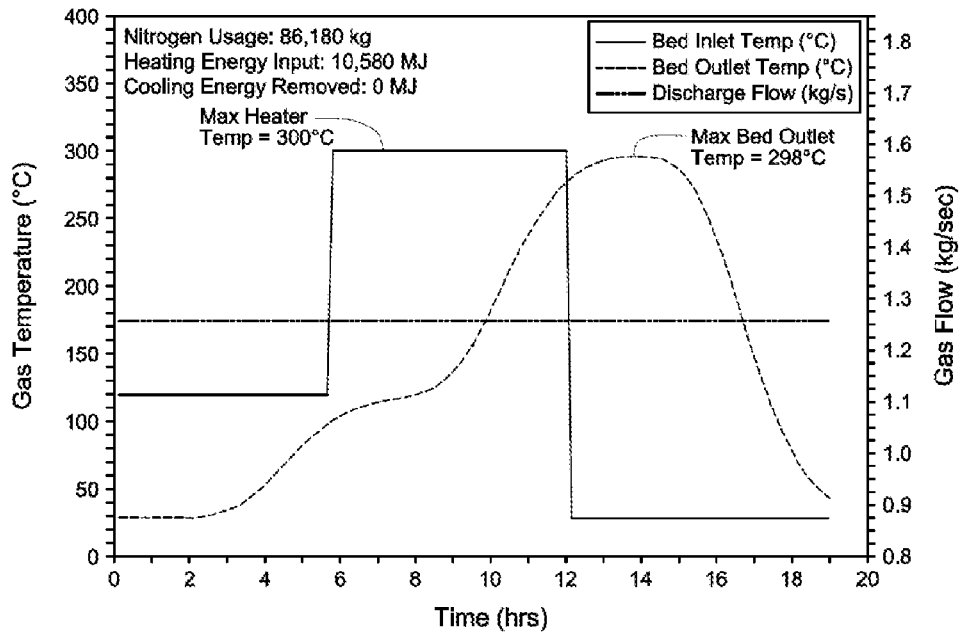
FIGS. 6-9 are results of computer simulations showing temperature profiles for a comparative example system without the features of this disclosure and for three method embodiments within this disclosure, respectively, providing estimated temperatures for the inert gas (motive gas), recycle composition (compressor suction), and regeneration composition (compressor discharge) streams during the process cycle.

FIG. 6 shows results of a computer simulation, showing the temperature profiles in a comparative example regeneration cycle without the use of one or more features of this disclosure. The profiles give estimated temperatures for the bed inlet (regeneration gas entering the bed) and the bed outlet (regeneration gas to vent). The profiles begin at the heating cycle and do not show the pressure reduction from operating pressure and the purge of the remaining interstitial gases or liquid. Inert gas for regeneration is assumed in this example to be heated at stepped intervals, say in three step intervals: 120° C., 300° C., and 30° C. (assumed ambient). In this control strategy, the bed outlet temperature increases as temperature of the vessel 110 increases, but with a lag time due to the thermal mass of the bed in vessel 110. When the heat is shut off there is again a lag in the cooling of the bed outlet temperature. This comparative example, and the subsequent examples using one or more features of this disclosure (FIGS. 7-9), assumes pure nitrogen as the regeneration gas and an ambient temperature of 30° C. (86° F.) which was also assumed to be the temperature of the bed when the regeneration began and the temperature of the pipeline nitrogen. In each of the comparative example of FIG. 6 and the examples in FIGS. 7-9, the thermal mass to be heated was the combination of the mass of bed material and the mass of steel for the vessel containing the bed material. The mass of bed material was 33,730 lbs (15,300 kg) with a constant heat capacity of 0.25 Btu/lb-F (1047 J/kg-K). The calculated mass of steel for the vessel containing the bed material was 32,340 lbs (14,670 kg) with a constant heat capacity of 0.11 Btu/lb-° F. (460 J/kg-° K). For the simulation an effective heat capacity was calculated to obtain a single heat capacity based on a weighted average of the bed material heat capacity and steel vessel heat capacity. Within the simulation, the thermal mass heating was accomplished by separating the thermal mass into one inch (25.4 mm) layer increments and calculating the incremental heating of each thermal mass layer for each incremental time period.

The following temperature values were manually entered into the simulation for the comparative example and each example case within this disclosure: bed material starting temperature, desired final bed outlet temperature during heating, maximum allowable heater gas outlet temperature (heated motive gas temperature), maximum allowable vessel inlet gas temperature, recycle steam heater outlet gas temperature, cooling gas temperature (ambient motive gas), recycle cooler outlet gas temperature, and desired final bed outlet temperature during cooling. The heater gas outlet temperature (heated motive gas temperature) was automatically calculated (controlled) to provide the desired maximum allowable vessel inlet gas temperature after the motive gas and suction gas streams mixed at each incremental time period. The maximum allowable vessel inlet gas temperature was maintained unless the manually entered maximum allowable heater gas outlet temperature value limited the desired temperature of vessel inlet gas after the motive gas and suction gas streams mixed. Yes/No options were included to select whether or not a jet was in use, the cooling cycle was in use, a recycle steam heater was in use, or a recycle water cooler was in use. These Yes/No options were used to set up each example case's system configuration.

The rate of heat transfer within each thermal mass layer was calculated using a constant heat transfer factor of 0.0167 Btu/(min-lb-F) (69.8 J/(min-kg-C)). The heat transfer factor was empirically selected to provide simulated heating curves comparable to curves generated from actual operating data.

The rate of heat transfer (HtRate) within each incremental thermal mass layer was calculated by multiplying the incremental thermal mass layer weight (SolWt) by the heat transfer factor (HTF) and by the temperature difference between the inlet gas temperature for the layer (InGasT) and the starting temperature of the thermal mass layer (SolStartT) (see Equation 1). The amount of heat transferred to the thermal mass layer (HtFlow) was found by multiplying the heat transfer rate by the incremental time period (Time) (see Equation 2). The final thermal mass layer temperature (SolEndT) was calculated by adding the starting thermal mass layer temperature (SolStartT) to the temperature increase of the thermal mass layer. The temperature increase of the thermal mass layer was calculated by dividing the amount of heat transferred (HtFlow) by the thermal mass layer weight (SolWt) and by the thermal mass effective heat capacity (SolCp) (see Equation 3). The mass of regeneration composition in one time period (GasFlow) was calculated by multiplying the gas rate (GasRate) by the incremental time period (Time) (see Equation 4). The outlet gas temperature (OutGasT) was calculated by subtracting the inlet gas temperature of the thermal mass layer (InGasT) by the temperature loss of the gas through the thermal mass layer. The temperature loss of the gas through the thermal mass layer was calculated by dividing the amount of heat transferred (HtFlow) by the mass of regeneration composition in one time period (GasFlow) and by the regeneration composition's heat capacity (GasCp) (see Equation 5).

$$\text{HtRate} = \text{SolWt} * \text{HTF} * (\text{InGasT} - \text{SolStartT}) \quad \text{Equation 1}$$

$$\text{HtFlow} = \text{HtRate} * \text{Time} \quad \text{Equation 2}$$

$$\text{SolEndT} = \text{SolStartT} + (\text{HtFlow}/(\text{SolWt} * \text{SolCp})) \quad \text{Equation 3}$$

$$\text{GasFlow} = \text{GasRate} * \text{Time} \quad \text{Equation 4}$$

$$\text{OutGasT} = \text{InGasT} - (\text{HtFlow}/(\text{GasFlow} * \text{GasCp})) \quad \text{Equation 5}$$

An iterative calculation was progressively performed for each thermal mass layer throughout the height of the bed material. This layer by layer progression through the bed material was then completed for each incremental time period. At the end of each incremental time period the temperature of each incremental layer was recorded in order to generate the temperature profile through the bed material with respect to the cycle time.

In the comparative and inventive examples, a representative cycle requires a first stage where the bed is pre-heated using inlet regeneration gas with a temperature of 120° C. (248° F.). The pre-heat ends when the outlet temperature from the bed reaches 100° C. (212° F.). The regeneration gas inlet temperature to the bed is then increased to 300° C. (572° F.) and maintained there until the outlet temperature from the bed reaches 280° C. (536° F.). In these examples the regeneration gas heater is then shut off and the flow of ambient temperature regeneration gas gradually cools the bed to near the ambient temperature. The temperatures and number of steps are intended to be representative only and are not limiting of the teachings of this disclosure.

Referring again to FIG. 6, the bed outlet temperature is observed to follow a smoothed curve due to the thermal mass of the bed and vessel. This is also why the peak bed outlet temperature occurs some time after the regeneration heater is turned off In this comparative example the regeneration cycle is seen to take approximately 12 hours for the illustrated two step heat up cycle and approximately 7 hours for the cool down cycle. The total comparative example cycle uses 86,180 kg (189,990 lb) of nitrogen based on a constant flow rate of 4,536 kg/h (10,000 lb/hr). The regeneration heater added 10,580 MJ (2,940 kW h) of energy based on a simplifying assumption of no thermal losses to the environment.

In operation of methods and systems in accordance with the present disclosure, various control strategies may be used. For example, referring again to FIG. 1, in one strategy (Case A), inert gas in conduit 102 may be heated at stepped intervals matching the regeneration gas steps of the FIG. 6 example. In this control strategy, the recycle temperature increases as temperature of the vessel 110 increases, but with a lag time due to the thermal mass of the bed in vessel 110. When the heat is shut off there is again a lag in the cooling of the recycle or suction stream 112. As shown the compressor discharge in stream 114 is essentially a weighted average of the temperatures of streams 106 and 112. This is illustrated graphically in FIG. 7. In another strategy (Case B) using a configuration as illustrated in FIG. 3, inert gas temperature in conduit 106 is adjusted to obtain regeneration gas temperature (jet compressor discharge temperature) in conduit 114 at near step intervals, for example 30° C., 140° C., 300° C., with maximum inert gas (motive gas) temperature, in this case 450° C. and with a cooler 122 being used to cool the recycle during the cool down stage. This strategy is illustrated in FIG. 8. In another strategy (Case C) that also uses a configuration as illustrated in FIG. 3, exchanger 122 is used as a heater to increase the suction temperature during the heating cycle and as a cooler to decrease the suction temperature during the cooling cycle. Inert motive gas temperature is also varied during the heating cycle (see FIG. 9).

Figure 7:
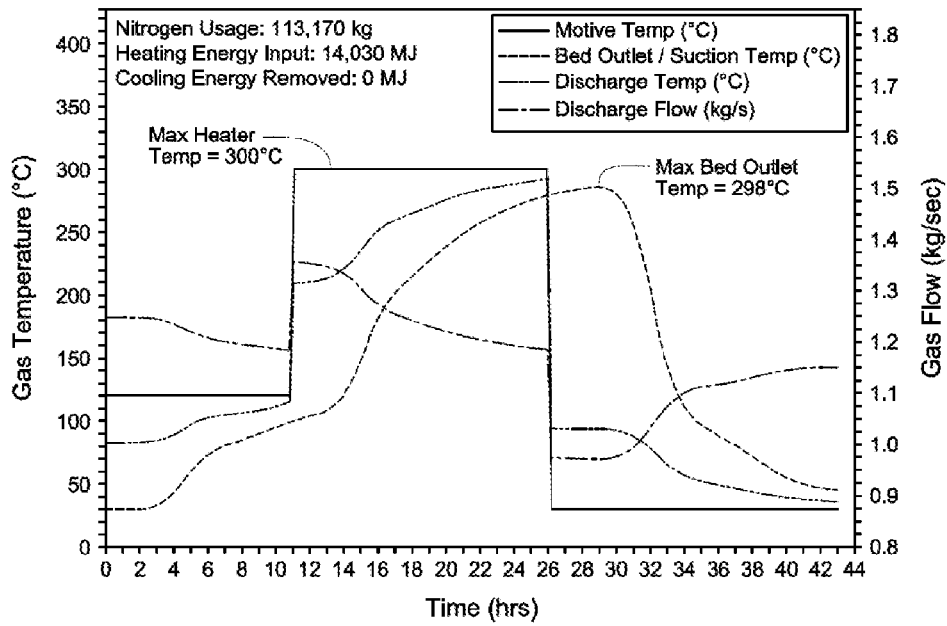
Figure 8:
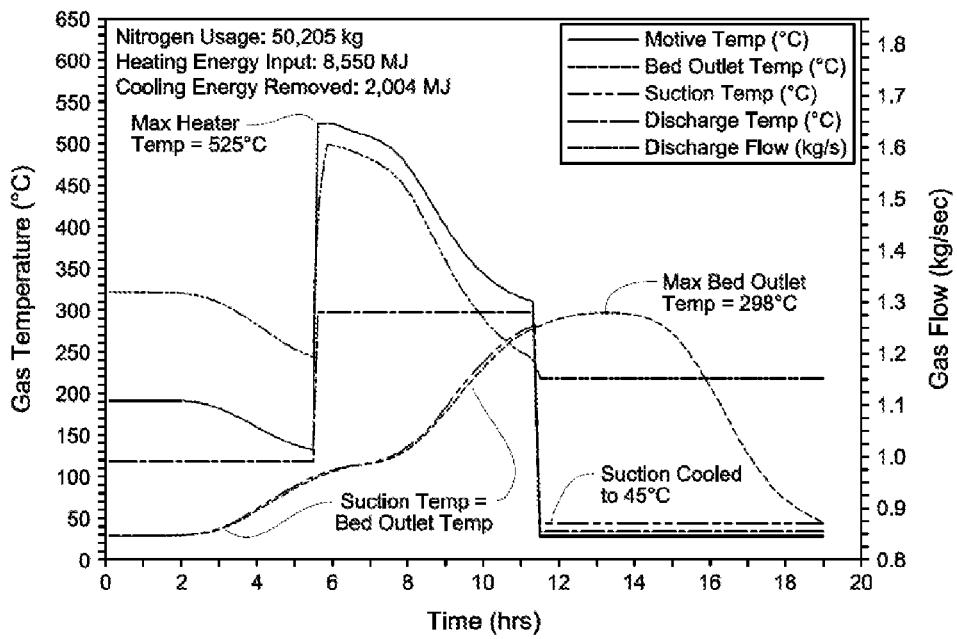
Figure 9:
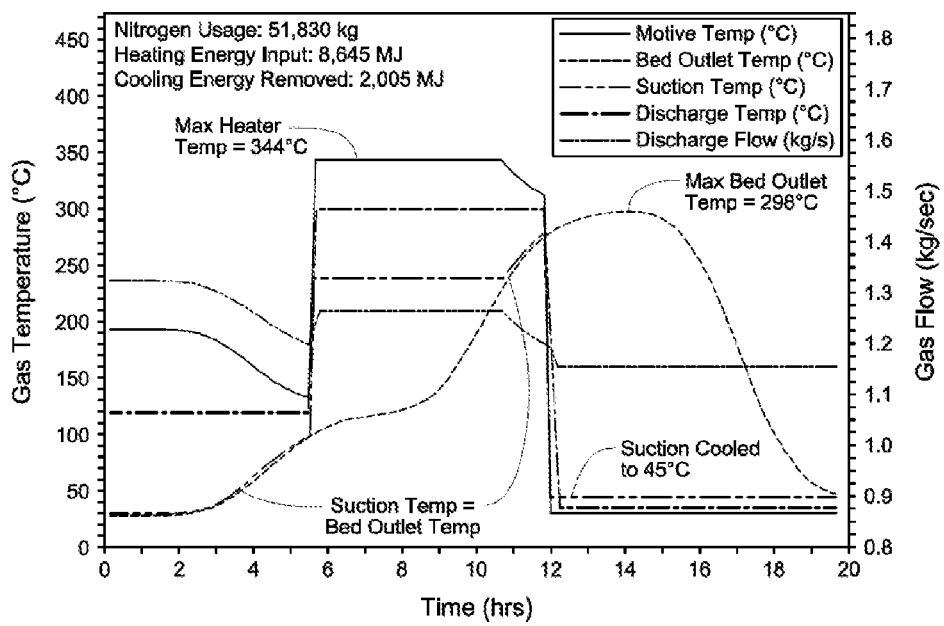

FIGS. 7-9 show temperature profiles for the three simulated Cases A, B and C discussed in the previous paragraph. The profiles give estimated temperatures for the inert gas (motive), recycle (compressor suction) and regeneration composition (compressor discharge) streams during the process cycle. The compressor discharge stream temperature was determined using a thermodynamic balance around a jet compressor at each point. The temperature profiles may change from embodiment to embodiment, but provide an initial estimate for typical operating conditions expected for each case.

Case A (FIG. 7) is a very simple system that reduces the pipeline nitrogen flow rate. However, because of the cooling effect of the recycle stream the heat up time increased in this simulation to approximately 26 hours. The recycle gas temperature 112 slowly increased due to the thermal mass of the vessel 110 bed to be regenerated. Therefore, the regeneration composition (compressor discharge) 114 temperature also slowly increased. The warming effect of the thermal lag in the recycle gas increased the cool down cycle time to approximately 17 hours.

In simulated strategy B (FIG. 8) the regeneration composition (compressor discharge) 114 temperature increased much faster than the recycle gas stream 112 because the initial temperature of the motive gas 106 at each step change was allowed to significantly overshoot the target regeneration composition temperature. Instead of stepping to a constant 300° C. as in Strategy A, the motive gas temperature stepped to 525° C. As the recycled suction gas 112 temperature increased the motive gas 106 temperature was then backed off so that the regeneration composition (compressor discharge) 114 temperature did not exceed its target for each step. This faster ramp-up of regeneration gas temperature decreased the example vessel 110 heat up time back to approximately 11.5 hours. Addition of a recycle heat-exchanger 122 used as a cooler, decreased the cool down time to approximately 7.5 hours.

Strategy C (FIG. 9) used one or more recycle heat exchangers 122 as both a cooler and a heater to achieve a similar result. Adding heat to the recycle line via exchanger 122 allowed for a continuous hot recycle of stream 112 and so the regeneration gas 114 temperature was maintained at each target with less overshoot of the motive gas 106 temperature above the desired regeneration temperature. This provided a heat up time of approximately 12 hours but without the very high temperatures of Strategy B. Using exchanger 122 as a recycle cooler allowed the cool down to be done in approximately 7.5 hours as with Strategy B.

The various strategies tend to dictate equipment selection. For example, in Case C, where the recycle stream is the highest temperature of these three particular embodiments, a steam heater would be beneficial compared to an electric heater for heat exchanger 122 to avoid coking out hydrocarbons in the recycle stream. Alternatively, an indirect system using a heat transfer fluid such as DOWTHERM might be used in strategy C so that a single exchanger 122 could be used for both the heating and cooling cycles. Higher temperature of the inert gas stream and/or recycle stream may indicate metallurgical requirements for conduits, fittings, valves, and other components. Where high temperatures are applied in heater 104 or 122 effective insulation will be required to ensure that surface temperatures are below the auto-ignition temperature of any hydrocarbons that may be accidentally released in the vicinity. There may be compressor limitations to going up to 450° C. (840° F.); for example, these limitations may indicate more expensive materials of construction, such as special alloys (high chrome steel, or stainless steel, for example). To gain experience with operating strategies, and to ensure that the equipment is cycled at consistent pressures and temperatures, it may be beneficial, but not necessary, to operate the methods and systems described herein by following the same or similar regeneration temperature profile for each regeneration cycle.

In certain embodiments it may be beneficial to step change the temperature of the inert gas (motive gas) temperature in Case B in more discrete steps, even though it may lengthen the regeneration time or cause the bed to see higher temperatures at certain times than today.

In certain embodiments, a single jet compressor may be designed to operate effectively during the thermal cycle, however this is not required. If this is desired, a jet compressor comprising materials of construction capable of withstanding the temperature changes and gradients during regeneration heating and cooling is necessary.

The skilled operator or designer in each embodiment will likely determine after a short time how to achieve the highest efficiency (defined as the maximum inert gas recycle flow rate) without undue experimentation. This will primarily be obtained through adjustment of the various flow stream pressures, such as jet compressor suction and discharge pressures, as well as temperature changes observed for the various streams. Skilled operators and designers will be able to decide on the advantages/disadvantages of the various embodiments and options, for example, would a multiple jet compressor system provide more efficiency than a single jet compressor, and which system pressure has the most influence on the jet compressor efficiency (inert gas, recycle, or compressor discharge), and sizing of the jet compressor(s), and what operating variable is the system most sensitive to (pressure, temperature, velocity, mass flow). Jet compressors are typically sold in a variety of frame sizes, and with various automatic control systems including a variable orifice for the motive gas inlet. The skilled compressor artisan will be able to decide what frame sizes and control systems are most beneficial for a particular regeneration scenario so as to produce the greatest amount of inert gas recycle. Typical automatic control strategies include feedback, feed-forward, cascade, and the like, and may be implemented via computer, either on-site or at a more centralized location. Proportional, integral, and differential control strategies may be employed, or combination thereof, such as PID controllers.

In any of the embodiments shown a jet compressor designed with a fixed nozzle orifice or variable nozzle orifice could be used. The fixed nozzle orifice design with a fixed nozzle orifice area provides a constant motive flow rate at a constant motive gas pressure and temperature. Variations in the motive gas pressure and/or temperature will result in a change in motive gas flow rate. An example of a variable nozzle orifice design is a spindle with a needle point that moves in and out of the nozzle orifice throat in order to reduce the nozzle orifice flow area. The change in nozzle orifice flow area results in a change in the gas flow through the nozzle orifice at a given pressure and temperature. The control of the variable nozzle orifice spindle's position could be either manual or automatic. Jet compressors with manually controlled spindles are used when the unit operates at a steady load but where flexibility in nozzle orifice is desired to compensate for changes in operating conditions. The spindle can be operated with a handwheel or similar attachment. Jet compressors with automatically-controlled spindles are used where pressure, suction, or discharge conditions vary and it is necessary to control discharge pressure or flow. The spindle can be operated with a diaphragm, piston, or motor actuator using any standard instrument signal—electric or pneumatic. The illustrated embodiments could employ any these spindle control methods. The control can be activated by temperature, pressure, flow or suction to motive gas ratio. The illustrated embodiments could employ any these system variables for control.

The inert gas used in the methods and systems described herein need not be completely devoid of reactant gases, as long as the regeneration of the purification bed proceeds in a safe and expeditious manner. The inert gas may be nitrogen, argon, krypton, xenon, carbon dioxide, or mixtures thereof, and may consist essentially of nitrogen purified from an air separation plant. The air separation plant may be selected from cryogenic, adsorption (pressure-swing, vacuum-swing, and temperature swing adsorption units are commercially available), and membrane separation plants. In certain embodiments the inert gas is nitrogen, and the nitrogen may be electronic or food grade nitrogen.

Pipeline nitrogen has the benefit of being at a pressure especially suited for use in a regeneration method, as it typically is already at or above the desired pressure, especially when the inert gas is used with a jet compressor to compress the recycle stream from the vessel containing the purification bed being regenerated.

The inert gas component may advantageously be supplied via a pipeline at pipeline pressure in certain embodiments. As noted in U.S. Pat. No. 6,196,021, after being generated in a cryogenic air separation plant, nitrogen gas is typically transported down a pipeline under high pressure, typically 250 to 600 psig (1700 to 4100 kPa gauge). The pressure for different systems will vary, but a pressure of 400 psig (2800 kPa gauge) is a common pressure level seen in nitrogen pipelines. Current practice would have the nitrogen gas reduced in pressure through pressure regulator or regulators at a pressure letdown station to the customer's requirement, for example 150 psig (1000 kPa gauge). Typically nitrogen gas in stream 102 is substantially free of moisture and carbon dioxide, and has a nitrogen concentration greater than 99 volume percent, in certain embodiments greater than 99.9, or 99.99, or even 99.999 volume percent.

In other embodiments, the inert gas may be supplied by an inert gas generator, such as a membrane or adsorption unit. These units are well-known for producing "on-site" nitrogen. In such "on-site" nitrogen generators, one or more compressors are used to compress air at a pressure greater than atmospheric pressure, typically several bar of pressure or higher. The compressed air, after filtration, water vapor removal, and possibly other operations known to the skilled artisan, is deliver as clean dry air containing, for example less than 1 ppm moisture (a dew point of 70° C. or less), less than 0.01 micron particulates and no detectable residual oil vapor, to the feed side of a membrane unit which includes a membrane of, for example, polyimide, polyamide, polyolefin, or other glassy polymer. On the non-permeate (feed) side of the membrane, a nitrogen enriched gas mixture is withdrawn which comprises less than about 5 percent (by volume) oxygen, and on the permeate side of the membrane (preferably, but not necessarily, the bore side) an oxygen enriched gas mixture at ambient or lower pressure is vented.

Adsorption-based systems may also be employed to supply inert gas. Known adsorption-based sources of nitrogen are a pressure-swing, vacuum-swing, and temperature swing adsorption units, which typically comprises two or more vessels containing an adsorbent material. When one adsorbent bed is "loaded", a control system switches or "swings" the feed air to the other vessel. In these embodiments, an air compressor is used to compress air at a pressure which is preferably at least equal to about 10 bar, prior to being filtered (first stages include preferably a water separator, coalescing and particulate filters and an activated carbon tower). Such nitrogen generators may comprise an oxygen sensor and an oxygen monitoring system, in order to monitor the oxygen content of the "impure" nitrogen gas generated. A surge tank may be connected between (or in parallel to) the generator and the inert gas preheater wherein the pressure may be maintained greater than the normal pressure for use of the nitrogen, usually about 10 bar or even more.

Appropriate membrane generators are for example those of the M 500 C. series of FLOXAL (a trademark of L'AIR LIQUIDE SA) Nitrogen membrane generators, as disclosed e.g. in the Tech Specs of such systems, incorporated therein by reference (those generators can usually provide nitrogen at different flow rates and different purities from about 95 volume percent inert gas to 99.5 volume percent inert gas).

Since approximately 50 volume percent or more of the vessel effluent gas is vented or flared the build-up of impurities in the cycle is limited. With no in-line cooling while the impurities are being driven off the bed, there is little or no water condensation in the system. Jet compressors have no moving parts and are relatively inexpensive. In certain embodiments we take advantage of the fact that pipeline nitrogen is available at >100 psig (690 kPa gauge) and the regeneration is done at lower pressure. Therefore, the methods and systems described herein, and variations thereof, provides a 30% or more reduction in regeneration nitrogen use (and methane use for flaring this nitrogen) with reduced power consumption and only a modest increase in investment.

Heat exchangers useful in the various embodiments may vary depending on the specific regeneration process. Although the various embodiments illustrated in the drawing figures may show a stream flowing through a shell and the other stream through a tube structure, the streams could be reversed. Also, where one exchanger unit is shown, it could as easily be two or more units in series or parallel. Useful heat exchangers may be shell-and-tube type, finned-tube, and the like. Flow arrangements may be counterflow, co-current flow, cross-flow, and the like. For cooling, the heat exchangers may employ air, such as in a fan air cooler; water, such as supplied by a cooling tower; glycol; or via a refrigeration cycle. Combinations of these may be used. If the inert gas is nitrogen or argon supplied from a cryogenic air separation plant, it may be feasible to integrate a conduit carrying, for example, a recycle composition from a vessel being regenerated into the cold box of the cryogenic air separation unit.

As illustrated in FIG. 1, in certain embodiments, while heating (or cooling) could be provided in the mixed stream between the compressor and vessel, in exemplary embodiments the inert or motive gas is heated (or cooled). This avoids the extra pressure drop in the recirculation system and since the heater/cooler only contacts relatively pure inert gas there is no coking risk.

Example

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

The following examples are derived from modeling techniques as permitted and referenced in M.P.E.P. §608.01(p).

Computer simulation and modeling of a system and method as illustrated in FIG. 1 was carried out using Microsoft's EXCEL software with macros written to determine the temperatures in each gas stream and each 1 inch (25 mm) interval of the bed, and recycle compressor suction to motive gas flow ratio at 60 second intervals. Based on vendor data a relationship of $Rw = 8.89 \times 10^{-4} \times (Tm - Ts + 0.834)$ was assumed for the jet compressor in this study. Where Rw equals the ratio of Suction mass flow divided by Motive mass flow; Tm equals Motive gas temperature; and Ts=suction gas temperature (both in degrees C.). Cryogenic purity nitrogen at 110 psig (760 kPa gauge) was used as the inert gas, at an ambient temperature (about 30° C.). In the simulation without using one or more features of the present disclosure, a flow rate of 10,000 lb/hr (4,536 kg/h) of pipeline nitrogen was heated to in a heat exchanger to the target temperatures, then expanded across a control valve or orifice to the assumed 35 psig (240 kPa gauge) regeneration inlet pressure. A pressure drop of 10 psig (69 kPa gauge) is assumed through the vessel and bed to be regenerated and associated piping. In Strategies A, B, and C a jet compressor replaces the pressure reduction valve or orifice so that the extra pressure energy is used to combine a reduced constant 5,800 lb/hr (2,630 kg/h) nitrogen motive stream with a recycle stream from the vessel containing the bed being regenerated. Based on parameters that may be adjusted by the person performing the simulation, such as the pressure in the vessel containing the bed being regenerated, the temperature of the feed temperature and flow rate through the vessel, the cross-sectional area and volume of the vessel, the type and volume of material in the vessel being regenerated, and the type and volume of impurities being removed from the bed, the temperature of the recycle stream was calculated by the simulation program in this simulation with a constant recycle pressure of 25 psig (172 kPa gauge), constant compressor discharge pressure of 35 psig (240 kPa gauge), and a constant motive gas pressure of 100 psig (690 kPa gauge). The simulation program calculated that the method and system as illustrated in FIG. 1 and FIG. 7 has a recirculation rate of 25 to 45 mass percent (i.e. ~75 to 55 mass percent fresh inert gas). It is seen in FIGS. 8 and 9 that this may be increased to a recirculation rate of 37 to 55 mass percent by changes in the equipment arrangement and operating strategy. It is anticipated that recirculation rates greater than approximately 70 mass percent may be possible by equipment selection, minimizing the cycle's pressure drop, or using a higher pressure motive gas source.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

Only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

All documents cited herein are fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A method of regenerating a purification bed contained in a vessel, the method using an open loop cycle wherein a portion of an effluent from the vessel is recycled as a recycle composition and the remainder is vented, the method comprising:

a) providing an inert gas at a first pressure P1;
b) combining the inert gas with a recycle composition from the vessel to form a regeneration composition at a second pressure P2, the recycle composition at a third pressure P3 such that P1>P2>P3; and
c) routing the regeneration composition to the vessel to regenerate the purification bed.

2. The method of claim 1, wherein the providing of the inert gas comprises supplying the inert gas at pressure P1 that is at least 1.5 times the pressure of the regeneration composition, P2.

3. The method of claim 1, wherein the providing of the inert gas comprises supplying the inert gas at pressure P1 ranging from at least two times to at most four times the pressure P2 of the regeneration composition.

4. The method of claim 1, wherein the providing of the inert gas comprises supplying the inert gas via a pipeline and P1 is pipeline pressure.

5. The method of claim 4, wherein the providing of the inert gas comprises supplementing the pipeline supply with inert gas generated by an on-site inert gas generator.

6. The method of claim 1, wherein the combining the inert gas with the recycle composition comprises combining the inert gas and recycle composition in a jet compressor.

7. The method of claim 1, wherein the recycle composition has a recirculation rate which ranges from about 20 to about 80 mass percent of a total flow of inert gas and recycle composition being combined.

8. The method of claim 7, wherein the non-recycled portion of a vessel effluent is routed to a disposal system.

9. The method of claim 8, wherein the inert gas is preheated by the non-recycled portion of the vessel effluent.

10. The method of claim 1, wherein there are a plurality of purification beds being regenerated in a corresponding plurality of vessels, each bed and vessel independently sized.

11. The method of claim 10, wherein combining the inert gas with a recycle composition from each vessel comprises combining separate inert gas streams with a corresponding recycle stream from each vessel.

12. The method of claim 11, wherein the combining occurs in a dedicated jet compressor for each combination of inert gas with a recycle composition.

13. The method of claim 1, comprising preheating the inert gas prior to combining with the recycle stream.

14. The method of claim 13, wherein the preheating of the inert gas comprises heating the inert gas temporarily to a temperature significantly over a target regeneration composition temperature, and then as temperature of the recycle composition increases, decreasing the inert gas temperature so that the regeneration composition temperature does not exceed its target.

15. The method of claim 1, further including a step selected from heating the recycle composition prior to combining with the inert gas during a bed heating cycle, and cooling the recycle composition prior to combining with the inert gas in a bed cooling cycle.

16. The method of claim 6, wherein two or more jet compressors are employed in parallel or in series.

17. The method of claim 1, wherein the method is used to reduce the volume of flare gases produced from an olefin polymerization facility.

18. A system for regenerating a purification bed contained in a vessel which uses an open loop cycle, wherein a portion of vessel effluent is recycled as a recycle composition, and the remainder is vented, the system comprising:
a) a supply of an inert gas at a first pressure P1;
b) the supply of inert gas fluidly connected via a conduit to a jet compressor for combining the inert gas with a recycle composition flowing through a first conduit fluidly connecting the jet compressor and a vessel containing a purification bed being regenerated, the jet compressor forming a regeneration composition at a second pressure P2, the recycle composition at a third pressure P3 such that P1>P2>P3;
c) a second conduit fluidly connecting the jet compressor with the vessel for routing the regeneration composition to the vessel to regenerate the purification bed.

19. The system of claim 18, selected from systems comprising a first heat exchange unit in the conduit connecting the supply of inert gas to the jet compressor, systems comprising a second heat exchange unit in the first conduit connecting the jet compressor and the vessel, and combinations thereof.

20. The system of claim 18, where in the purification bed comprises a first purification bed and a second purification bed fluidly connected in series, the first and second beds having the same or different respective purification bed compositions.

21. The system of claim 20, wherein the vessel comprises a first and a second vessel, and the first purification bed resides in the first vessel fluidly connected in series to the second vessel containing the second purification bed.

22. The system of claim 20, wherein the first purification bed resides in a first volume of the vessel and the second purification bed resides in a second volume of the vessel.

* * * * *